United States Patent [19]
Oberbeck

[11] 3,825,998
[45] July 30, 1974

[54] METHOD FOR PRODUCING DIELECTRICALLY COATED WAVEGUIDES FOR THE $H_{0,1}$ WAVE

[75] Inventor: Helmut Oberbeck, Backnang, Germany

[73] Assignee: LICENTIA Patent-Verwaltungs-G.m.b.H., Frankfort am Main, Germany

[22] Filed: Dec. 27, 1972

[21] Appl. No.: 318,936

[30] Foreign Application Priority Data
Dec. 30, 1971  Germany.............................. 2165553

[52] U.S. Cl. ................................ 29/600, 333/95 R
[51] Int. Cl. ............................................ H01p 11/00
[58] Field of Search ............ 29/600; 204/9; 333/95, 333/96, 97, 98

[56] References Cited
UNITED STATES PATENTS

| | | | |
|---|---|---|---|
| 2,592,614 | 4/1952 | Stoddard................................ | 29/600 |
| 3,148,314 | 9/1964 | Ponemon............................... | 29/600 |
| 3,464,898 | 9/1969 | Morris..................................... | 204/9 |
| 3,566,316 | 2/1971 | Sawada et al........................... | 333/95 |
| 3,733,693 | 5/1973 | Larsen.................................... | 29/600 |

*Primary Examiner*—Charles W. Lanham
*Assistant Examiner*—James R. Duzan
*Attorney, Agent, or Firm*—Spencer & Kaye

[57] ABSTRACT

A waveguide for transmitting $H_{0,1}$ waves is produced by applying a separating layer to the cylindrical outer surface of a steel mandrel; applying a copper coating to the separating layer; applying a layer of glass saturated with self-hardening plastic to the copper layer; causing the glass fibers to form a bond with the copper layer; removing the steel mandrel thus leaving a resulting tubular structure; and applying a dielectric layer to the interior surface of the resulting tubular structure.

4 Claims, 2 Drawing Figures

PATENTED JUL 30 1974

3,825,998

3,825,998

METHOD FOR PRODUCING DIELECTRICALLY COATED WAVEGUIDES FOR THE $H_{0,1}$ WAVE

BACKGROUND OF THE INVENTION

The present invention relates to a method for producing dielectrically coated waveguides for the transmission of an $H_{0,1}$ wave, particularly waveguides consisting of several superimposed layers. The waveguide is constructed in layers which are applied over a steel mandrel, or sleeve.

In various known manufacturing methods for producing waveguides, steel tubes which have initially been fabricated to the closest possible tolerances are provided on their interior surfaces with a uniformly applied copper layer. A plastic layer is then applied to the inside surface of this copper layer, either directly or in a vacuum.

SUMMARY OF THE INVENTION

An object of the present invention is to improve the method of constructing such waveguides.

According to the present invention, the following method steps, several of which are individually partially known, are carried out in the order presented to construct the desired waveguide: providing a steel mandrel, or sleeve; coating of the steel mandrel with a separating layer; applying a copper layer onto the separating layer; applying at least one layer of glass fibers which are saturated with a self-hardening plastic on the copper layer, the glass fiber layer then forms a bond with the copper layer; removing the steel mandrel thus leaving a resulting tubular structure; and applying a dielectric material to the interior surface of the resulting tubular structure.

The separating layer is preferably composed of chrome or nickel chrome. The copper layer may be applied by any one of several known techniques, two examples of which are the Schoop process and electrolytic deposition processes.

A primary advantage of this method is that, in contradistinction to known conventional methods, the mandrel, which must have very precise dimensions, need be constructed only once for producing a plurality of tubular waveguides since the mandrel imparts its precision to all the tubular pieces which are fabricated with it.

DESCRIPTION OF THE PREFERRED EMBODIMENTS

Figure 1:
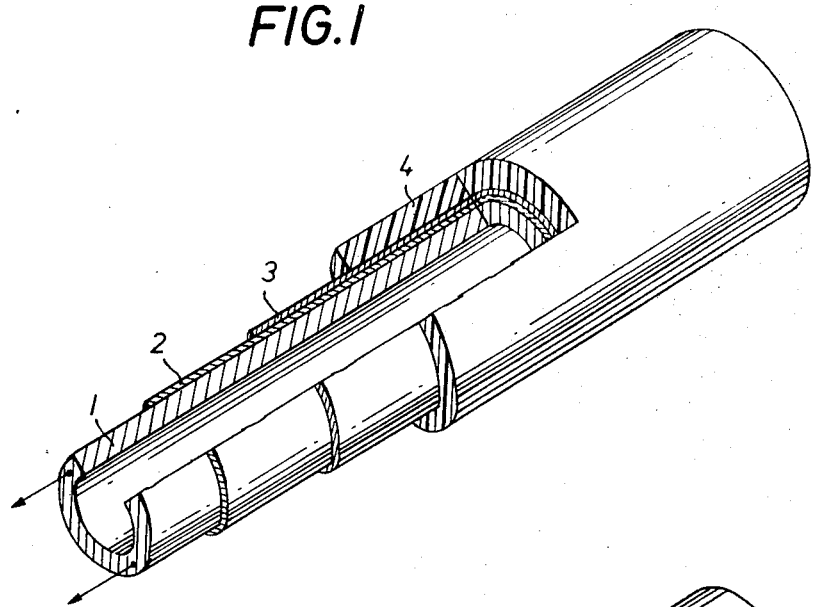
FIG. 1 is a perspective view of a waveguide which is applied in layers on a mandrel in accordance with the method of the present invention with a portion cut away so as to provide a partial sectional view.

FIG. 1 shows a section of a waveguide constructed in accordance with the present invention. The result of each individual process step is illustrated as an individual tubular section. A steel mandrel 1 which may be a tubular sleeve, is provided. This mandrel is constructed with a precision cylindrical surface. A separating layer 2 is first applied to the steel mandrel. This separating layer serves to permit easy removal of the mandrel 1 after the application of the individual layers and completion of the waveguide. This layer 2 should have a hard structure in order to reproduce the cylindrical surface of the mandrel as closely as possible. Layers of chrome or nickel chrome are well suited for this purpose. It is assumed that the separating layer will automatically oxidize, which will assist in the detachment of the copper layer from the steel mandrel.

A copper layer 3 is then applied to this separating layer 2. This copper layer constitutes the actual waveguide and serves to propagate the electrical waves. The surface of this conductive layer should be made as smooth as possible in order to keep attenuation of the waves to a minimum. For this reason, the surface of the separating layer should also be very finely shaped in order to provide a smooth surface onto which the copper can be applied.

The copper layer can be applied by either one of the following two processes:

1. The Schoop process, in which the metal is introduced in the form of a wire into an ejection nozzle. In this nozzle, the wire is melted either electrically or by using an oxyhydrogen blowpipe. The molten metal is then ejected with the aid of compressed air onto the surface of the separating layer 2 which is on the mandrel 1.
2. In an electrolytic process, the steel mandrel 1 with its separating layer 2 is placed into an electrolytic path where the copper layer is applied by the known method of electrolysis, with the bath consisting of either sulphonic-acid or cyanid-acid and being maintained at about 20°C.
3. A combination of both.

In the subsequent process step at least one layer 4 of glass fibers is applied onto the outer surface of the copper layer 3. This layer 4 is saturated with a self-hardening plastic material, for example, an epoxy resin. The glass fiber layer 4 forms a bond with the copper layer 3. Care should be taken to ensure that a close bond is produced between the copper layer and the glass fiber layer 4. This is important in order for the copper layer to firmly adhere to the glass fiber layer. This may be accomplished by the application of a temperature of 70° C and a pressure of few mm.

After hardening of the applied glass fiber layer 4 the steel mandrel 1 is removed, thus leaving a resulting tubular structure. This process is indicated in FIG. 1 by the two arrows. The removal may be facilitated by self-oxihydrodizing the separating layer of chrome or nickel chrome. This very thin oxyhidrodized surface of the separating layer causes the perfect passivity of the nickel or nickel chrome layer which has no influence on the electrolytic process. The mandrel which has been removed can be used again for constructing another waveguide. The separating layer 2, which remains on the inner surface of the resulting tubular structure when the mandrel 1 is removed, has no effect on the electromagnetic waves which are later transmitted through the waveguide.

Figure 2:
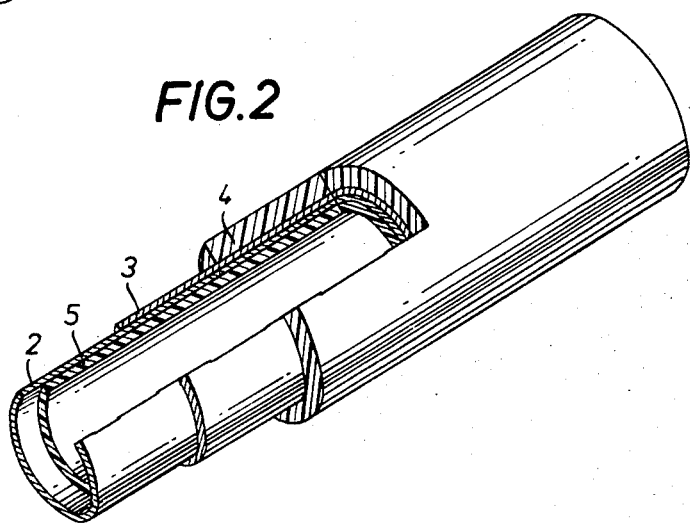
FIG. 2 is a view similar to FIG. 1 with the mandrel removed and the dielectric layer applied in accordance with the method of the invention.

After removal of the steel mandrel 1, a further layer 5 is then applied to the inner surface of the separating layer 2 in a further process step (see FIG. 2). This layer 5 consists of a material having good dielectric properties. The layer 2 can be applied by either of two methods onto the steel-mandrel. The first method is a galvanizing process, in which case the thickness of the layer is only 2 to 20 μm. The second method is a mechanical process, in which case the layer may be several millimeters thick. In the extreme case, the mandrel could consist of pure chrome or nickel-chrome, but the use of such a mandrel would be too expensive for practical purposes. In using a mechanical process of forming the separating layer, the surface of the separating layer must be given the same precision that the steel mandrel would have.

The layer 3 may be from 0.1 to 2 mm thick depending on which of the three application-processes is used.

The layer 5 shall consist of layer of lossless dielectric material preferable with a thickness of approximately 0.05–0.1 mm.

A very probable modification would be to cover the glass fiber layer with a rough steel-tube and fill the space between this steel-tube and the glass fiber layer with a self-hardening plastic material with the help of a vacuum at a temperature of 60°–80° C.

It will be understood that the above description of the present invention is susceptible to various modifications, changes and adaptations and the same are intended to be comprehended with the meaning and range of equivalents of the appended claims.

I claim:

1. A method for producing a dielectrically coated tubular waveguide composed of a plurality of superimposed layers for transmission of $H_{0.1}$ waves, comprising, in the order recited, the steps of:
   providing a steel mandrel having a cylindrical outer surface;
   coating the steel mandrel with a separating layer composed of a material selected from the group consisting of chrome and nickel chrome;
   oxidizing the separating layer;
   applying a copper layer onto the separating layer;
   applying a layer of glass fibers saturated with self-hardening plastic material onto the copper layer;
   causing the glass fiber layer to form a bond with the copper layer;
   removing the steel mandrel so as to leave a resulting tubular structure; and
   placing a dielectric material on the interior surface of the resulting tubular structure.

2. A method for producing a waveguide as defined in claim 1 wherein said step of applying the copper layer is carried out by the Schoop process.

3. A method for producing a waveguide as defined in claim 1 wherein said step of applying the copper is carried out by an electrolytic process.

4. A method for producing a waveguide as defined in claim 1 further comprising the step of covering the layer of glass fibers saturated with selfhardening plastic with a steel-tube.

* * * * *